United States Patent
Koo et al.

(10) Patent No.: US 9,243,361 B2
(45) Date of Patent: Jan. 26, 2016

(54) WASHING MACHINE AND METHOD FOR CONTROLLING SAME

(75) Inventors: Bon Kwon Koo, Seoul (KR); Kyo Soon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 13/638,102

(22) PCT Filed: Apr. 1, 2011

(86) PCT No.: PCT/KR2011/002298
§ 371 (c)(1),
(2), (4) Date: Dec. 5, 2012

(87) PCT Pub. No.: WO2011/122915
PCT Pub. Date: Oct. 6, 2011

(65) Prior Publication Data
US 2013/0098119 A1  Apr. 25, 2013

(30) Foreign Application Priority Data

Apr. 1, 2010  (KR) .................. 10-2010-0030022

(51) Int. Cl.
*D06F 37/20* (2006.01)
*D06F 33/02* (2006.01)
*D06F 35/00* (2006.01)
*D06F 37/30* (2006.01)
*D06F 39/08* (2006.01)

(52) U.S. Cl.
CPC .............. *D06F 37/203* (2013.01); *D06F 33/02* (2013.01); *D06F 35/005* (2013.01); *D06F 37/304* (2013.01); *D06F 39/088* (2013.01); *Y02B 40/52* (2013.01)

(58) Field of Classification Search
CPC ..... D06F 33/02; D06F 35/005; D06F 37/203; D06F 37/304; D06F 39/088
See application file for complete search history.

(56) References Cited

U.S. PATENT DOCUMENTS

| 2,984,094 A | * | 5/1961 | Belaieff | 68/23.2 |
| 2006/0021392 A1 | * | 2/2006 | Hosoito et al. | 68/12.04 |
| 2008/0104769 A1 | * | 5/2008 | Ryu et al. | 8/159 |

FOREIGN PATENT DOCUMENTS

| EP | 0768422 | 4/1997 |
| EP | 0878575 | 11/1998 |
| EP | 1561851 | 8/2005 |
| EP | 1921196 | 5/2008 |

OTHER PUBLICATIONS

International Search Report issued in PCT Application No. PCT/KR2011/002298 dated Apr. 5, 2012.

* cited by examiner

*Primary Examiner* — Joseph L Perrin
(74) *Attorney, Agent, or Firm* — Ked & Associates, LLP

(57) ABSTRACT

A washing machine that calculates a temperature of a balancer to effectively control a motor and a method of controlling the washing machine are provided. The washing machine comprises a rotatable drum that receives laundry, a motor that rotates the drum, a balancer that is connected to the drum, the balancer changing a center of gravity of the drum, and a controller that rotates the motor at a constant rotational speed and then calculates a temperature of the balancer based on a period of a variation in rotational speed of the motor.

15 Claims, 6 Drawing Sheets

WASHING MACHINE AND METHOD FOR CONTROLLING SAME

CROSS-REFERENCE TO RELATED PATENT APPLICATIONS

This application is a U.S. National Stage Application under 35 U.S.C. §371 of PCT Application No. PCT/KR2011/002298, filed Apr. 1, 2011, which claims priority to Korean Patent Application No. 10-2010-0030022, filed Apr. 1, 2010.

TECHNICAL FIELD

The embodiments of this disclosure are directed to a washing machine that effectively controls a motor by calculating a temperature of a balancer and a method of controlling the washing machine.

BACKGROUND ART

In general, washing machines remove dirt from clothing or beddings (hereinafter, referred to as "laundry") using mechanical interactions between water, detergent, and laundry. A washing machine performs washing, rinsing, or dehydrating operations to clean the laundry.

Washing machines include agitator-type, pulsator-type, and drum-type washing machines.

An agitator-type washing machine includes a washing rod at a center of a washing tub. The washing rod swings left and right for washing the laundry. A pulsator-type washing machine includes a plate-shaped pulsator at a lower portion of a washing tub. The pulsator rotates left and right to cause a friction between water and laundry so that the laundry is washed by the friction. A drum-type washing machine includes a drum to contain water and laundry. Washing is conducted by rotating the drum.

A drum-type washing machine includes a cabinet configuring the appearance, a tub in the cabinet to contain water, a drum inside the tub to receive laundry, a motor at a rear side of the tub to rotate the drum, and a drive shaft that is connected to a rear side of the drum through the motor and the tub. A lifter is provided inside the drum to lift the laundry when the drum rotates.

When the washing machine operates, laundry tends to be easily tangled so that laundry is biased to a side (generally referred to as "eccentricity"). As the drum rapidly rotates with the laundry biased (for example, upon dehydration of the laundry), an unbalance occurs between a geometrical center of the rotational shaft of the drum (also referred to as "center of rotation") and a real center of gravity of the drum, thus causing vibrations and noise. To reduce vibrations and noise, a balance is installed that mitigates the unbalance.

Counter weights have been used as balancers for drum-type washing machines. A counter weight provides additional weight to calibrate eccentricity. Recently, ball balancers are being widely employed for washing machines. A ball balancer has a ring-shaped space circumferentially installed at a front or rear side of a drum to have a predetermined width. A ball and a liquid are filled in the space and thermally bonded to each other to tightly seal the space. As the drum rotates at high speed, the balancer causes its inner materials to be moved away from the center of gravity of the laundry so that the overall center of gravity of the drum approaches the center of rotation.

Such a balancer-adopted washing machine has a time period of rotating the drum at a predetermined speed before high-speed spinning. Then, an unbalance value of the drum is calculated from a variation in rotational speed of the drum. The drum is accelerated at an appropriate acceleration time is determined based on the unbalance value. However, the unbalance value may vary with temperature of the balancer, thus leading to a wrong acceleration time.

DISCLOSURE

Technical Problem

Embodiments of the present invention provide a washing machine and a method of controlling the washing machine, which may calculate a temperature of a balancer, may change the acceleration time depending on the temperature of the balancer, and may adjust the temperature of the balancer when the temperature is too high or low.

Technical Solution

According to an embodiment of the present invention, there is provided a washing machine comprising a rotatable drum that receives laundry, a motor that rotates the drum, a balancer that is connected to the drum, the balancer changing a center of gravity of the drum, and a controller that rotates the motor at a constant rotational speed and then calculates a temperature of the balancer based on a period of a variation in rotational speed of the motor.

According to an embodiment of the present invention, there is provided a method of controlling a washing machine, the method dehydrating laundry received in a drum combined with a balancer by accelerating the drum after having rotated the drum at a constant rotational speed, the method comprising rotating a motor at a constant rotational speed, the motor rotating the drum and calculating a temperature of the balancer based on a period of a variation in rotational speed of the motor.

Advantageous Effects

According to the embodiments of the present invention, the temperature of the balancer may be calculated without a separate device, such as a sensor. The acceleration time is changed depending on the temperature of the balancer, so that vibrations may be prevented from occurring during a transient vibration range. When the temperature of the balancer is too high or too low, appropriate steps may be taken to adjust the temperature of the balancer.

BEST MODE

Figure 1:
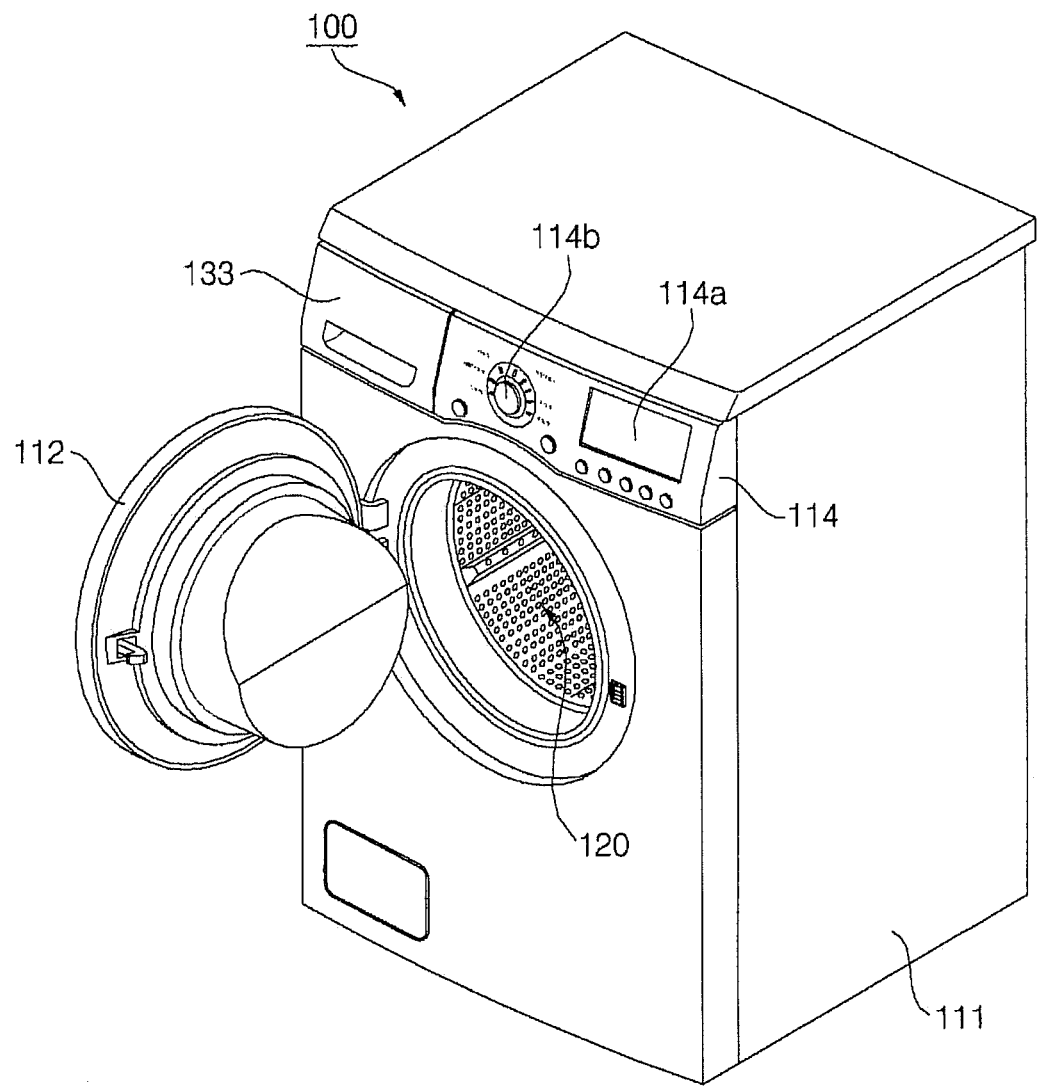
FIG. 1 is a perspective view illustrating a washing machine according to an embodiment.

Hereinafter, the embodiments of the present invention will be apparent from the detailed description taken in conjunction with the accompanying drawings. However, the present invention may be embodied in various forms without being limited to the embodiments. Rather, the embodiments are merely provided to thoroughly and clearly disclose the invention and to fully convey the concept of the invention to one of ordinary skill in the art while the present invention is defined only by the claims.

Hereinafter, exemplary embodiments of the present invention will be described with reference to the accompanying drawings, wherein the same reference numerals may be used to denote the same or substantially the same elements throughout the specification and the drawings.

Figure 2:
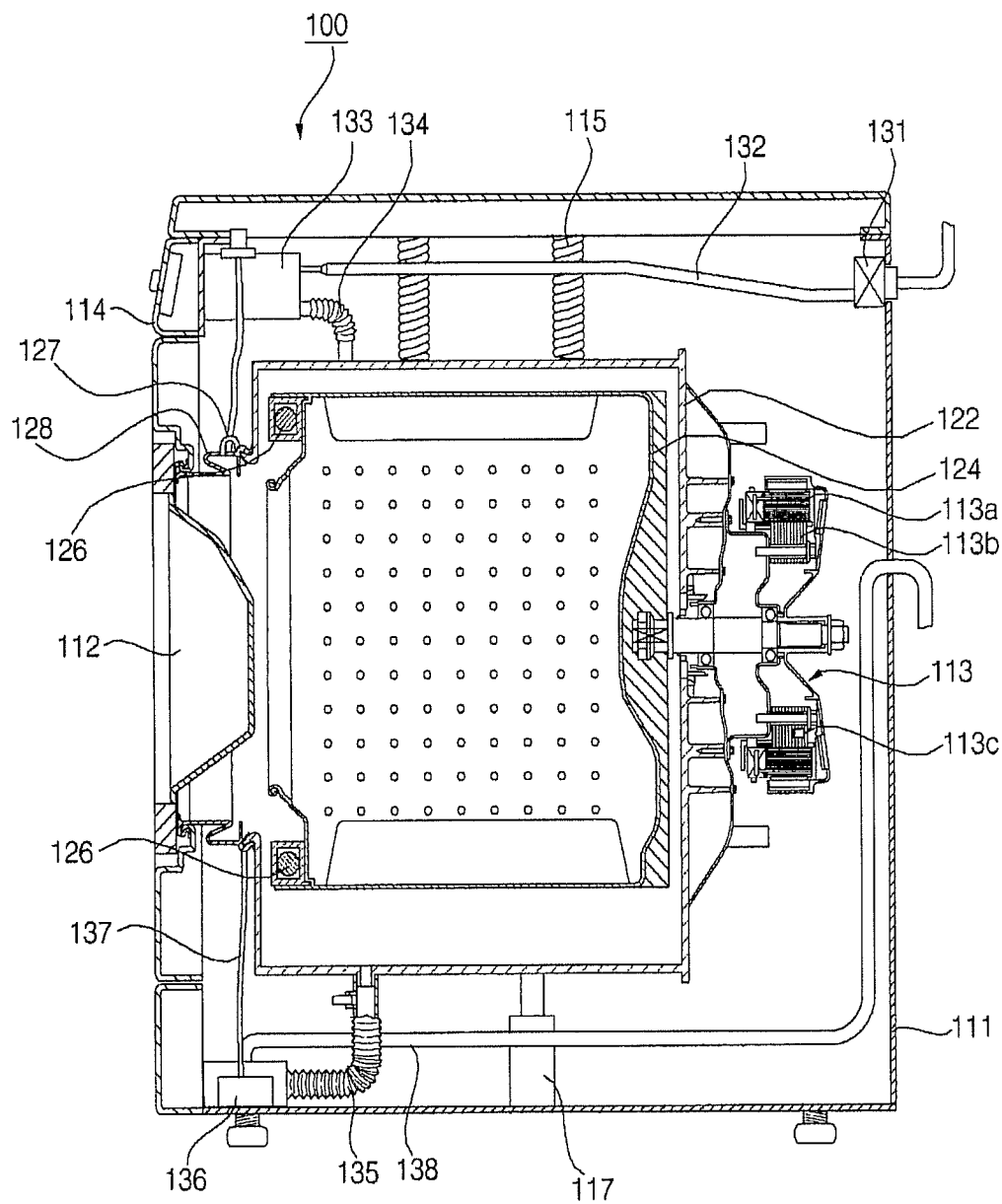
FIG. 2 is a cross-sectional view of the washing machine of FIG. 1.

FIG. 1 is a perspective view illustrating a washing machine according to an embodiment, and FIG. 2 is a cross-sectional view of the washing machine of FIG. 1.

The washing machine 100 includes a cabinet 111 that forms the appearance, a door 112 that opens/closes a side of the cabinet so that laundry may be entered/exited into/from the cabinet, a tub 122 that is arranged in the cabinet and supported by the cabinet, a drum 124 that is positioned in the tub to rotate laundry received therein, a motor 113 that rotates the drum, a detergent box 133 that receives a detergent, and a control panel 114 that receives a user's inputs and displays the status of the washing machine.

The cabinet 111 includes a hole 120 through which the laundry is entered or exited. The door 112 is pivotably provided at the cabinet 111 to open and close the hole 120. The control panel 114 is provided on the cabinet 111. The detergent box 133 is provided to be withdrawn from the cabinet 111.

The tub 122 is positioned in the cabinet to be shock-absorbed by a spring 115 and a damper 117. The tub 122 receives water for washing laundry (also referred to as "washing water"). The drum 124 is positioned in the tub 122.

The drum 124 rotates with laundry therein. The drum 124 has a plurality of pores through which washing water passes. A lifter is arranged at an inner wall to lift the laundry to a predetermined height when the drum rotates. The drum is rotated by the motor 113.

A balancer 126 is provided around the drum 124 and adjusts the center of gravity of the drum when the laundry is biased to a side. When the drum rotates with the laundry biased, an unbalance occurs between a geometrical center of a rotational shaft of the drum 124 (also referred to as "center of rotation") and a real center of gravity of the drum 124, thus creating vibrations and noise. The balancer 126 allows the real center of gravity of the drum 124 to approach the center of rotation, thereby reducing the unbalance.

Although in the present embodiment, the balancer 126 is provided at a front side of the drum 124, the balancer 126 may be alternatively provided at a rear side of the drum 124. When the drum 124 rotates, the laundry is generally moved rearward in the drum 124. For example, the balancer 126 is provided at a front side of the drum 124 to be balanced with the laundry.

The balancer 126 includes a material with a predetermined weight so that the center of gravity can be variably shifted. The balancer 126 includes a path formed along a circumferential direction. The material is movable along the path to be away from the center of gravity of the laundry, so that the center of gravity of the drum 124 approaches the center of the rotational shaft. According to embodiments, the balancer 126 includes a liquid balancer that includes a liquid with a predetermined weight r a ball balancer that includes a ball with a predetermined weight. In the present embodiment, the balancer 126 includes both a liquid and a ball.

A gasket 128 is provided between an inlet of the tub 122 and the hole 120 to seal a space between the tub 122 and the cabinet 111. The gasket 128 mitigates a shock transferred to the door 112 when the drum 124 rotates and prevents washing water from leaking from the tub 122. The gasket 128 includes a circulation nozzle 127 that introduces washing water into the drum 124.

The motor 113 rotates the drum 124 at various speeds in various directions. The motor 113 includes a stator 113a around which coils are wound and a rotor 113 that rotates to electromagnetically interact with the coils.

The stator 113a includes a plurality of wound coils. The rotor 113b includes a plurality of magnets. An electromagnetic interaction between the coils and magnets creates a rotational force that is then transferred to the drum 124 to spin the drum 124.

The motor 113 includes a hole sensor 113c that measures a position of the rotor 113b. The hole sensor 113c produces on/off signals when the rotor 113b rotates. The speed and position of the rotor 113b may be estimated based on the on/off signals.

The detergent box 133 receives detergent, such as laundry detergent, fabric softener, or bleach. The detergent box 133 is provided at a front side of the cabinet 111 to be withdrawn from the cabinet 111. Upon supply of washing water, the detergent is mixed with the washing water and then introduced into the tub 122.

The cabinet 111 includes therein a water supply valve 131 that adjusts inflow of washing water from an external source (not shown), a water supply path 132 through which washing water passes, and a water supply pipe 13 that leads mixed water into the tub 122.

Also, the cabinet 111 includes therein a water discharge pipe 135 through which washing water is discharged from the tub 122, a pump 136 that discharges washing water from the tub to the outside, a circulation path 137 that circulates washing water, a circulation nozzle 127 that introduces washing water into the drum 124, and a discharge path 138 that leads washing water to the outside. According to an embodiment, the pump 136 includes a circulation pump and a discharge pump that are respectively connected to the circulation path 137 and the discharge path 138.

The control panel 114 includes an input unit 114b that receives washing course selection, operation time for each washing course, course reservation, or other various commands from a user, and a display unit 114a that displays the operation status of the washing machine 100.

The control panel 114 includes a controller (not shown) that controls the motor 113 and calculates an unbalance value of the drum 1224 based on a variation in rotational speed of the motor. Also, the controller accelerates the motor 113 depending on the unbalance value.

If the drum 124 rotates at a constant speed while unbalanced, the rotational speed of the rotor 113b slightly varies. The controller calculates an unbalance value of the drum 124 based on a variation in rotational speed of the rotor 113b. The controller calculates the unbalance value from a difference between the variation in rotational speed of the rotor 113b and a pre-stored reference speed variation. The reference speed variation may vary depending on the amount of laundry received in the drum 124 and the rotational direction of the drum 124. Since the difference between the variation in rotational speed of the rotor 113b and the reference speed variation varies with time, the unbalance value of the drum 124 changes at a predetermined period. The controller accelerates the motor 113 depending on the calculated unbalance value.

An operation of the washing machine according to an embodiment will now be described.

A user opens the door 112 to put laundry in the drum 124, and then manipulates the control panel 114 to operate the washing machine. Thereafter, the washing machine sequentially performs a cleaning cycle, such as washing, rinsing, and dehydrating procedures. During washing, washing water is supplied to the laundry along with detergent and the drum 124 is then rotated to remove dirt from the laundry. During rinsing, waster and fabric softener are supplied to the laundry while the drum 124 rotates, thus removing the remaining detergent from the laundry. Dehydrating swiftly rotates the drum 124 to remove water from the laundry. According to an embodiment, procedures of supplying and discharging and drying the laundry may be added to the cleaning cycle.

According to an embodiment, the dehydrating procedure may be included in each of the washing and rinsing procedures. Upon dehydration, the drum 124 rotates at 400 RPM (Revolution Per Minute) to 1000 RPM. Thus, if the drum 124 is greatly unbalanced, considerable vibrations and noise are crated. Accordingly, as the dehydration begins, the controller calculates an unbalance value of the drum 124 while keeping the rotational speed of the motor 113 constant. Based on the calculated unbalance value, the controller accelerates the motor 113 when the balancer 126 is positioned at a proper location. For example, the controller accelerates the motor 113 at an appropriate time depending on the unbalance value of the drum. The rotational speed of the motor for calculating the unbalance value of the drum 124 may be, for example, 108 RPM at which the laundry rotates without causing noise and vibrations while stuck on the inner wall of the drum 124.

Figure 3:
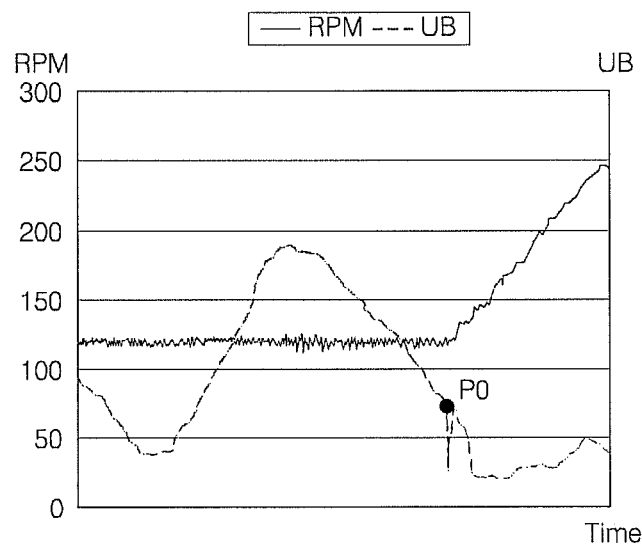
FIGS. 3 and 4 illustrate examples where transient vibrations occur in a washing machine according to an embodiment of the present invention.
Figure 4:
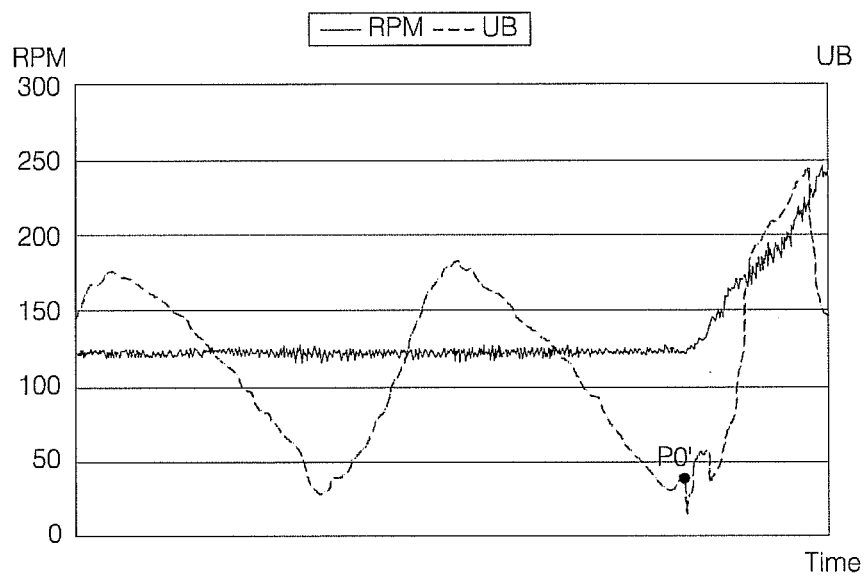

FIGS. 3 and 4 illustrate examples where transient vibrations occur in a washing machine according to an embodiment of the present invention.

The "transient vibrations" refer to vibrations that are drastically generated within a predetermined rotation speed range of the drum 124 due to the washing machine's own physical properties. A rotational speed range within which the transient vibrations occur is referred to as a "transient vibration range". The transient vibration range may be experimentally obtained by increasing the rotational speed of the drum 124 with no laundry received in the drum 124.

The transient vibration range generally occurs two times at low and high speeds. For example, the low speed transient vibration range appears at 170 to 400 RPM and the high speed transient vibration range appears at 800 PRM.

During the transient vibration range, the balancer 126 needs to be moved away from the center of gravity of the laundry so that the center of gravity of the drum 124 approaches the rotational center to minimize vibration of the drum 124. Accordingly, the motor 113 needs to be accelerated at a proper acceleration time depending on the unbalance value of the drum 124 so that the balancer 126 is positioned at a proper location during the transient vibration range.

FIG. 3 illustrates an example of accelerating the motor 113 when the unbalance value UB of the drum 124 is P0 where it is proper to accelerate the motor 113. Referring to FIG. 3, the controller rotates the motor 113 at a predetermined rotational speed and then calculates the unbalance value UB of the drum 124. For example, the motor 113 rotates at 108 RPM.

The unbalance value UB of the drum 124 varies at a predetermined period. The controller accelerates the motor 113 when the unbalance value UB is P0 while decreasing from the maximum value to the minimum value.

When the motor 113 is accelerated to pass the transient vibration range between 170 RPM and 400 RPM, the unbalance value UB of the drum 124 remains low. For example, large vibrations are not produced during the transient vibration range.

FIG. 4 illustrates an example of accelerating the motor 113 when the unbalance value UB of the drum 124 is P0' where it is not appropriate to accelerate the motor 113. Referring to FIG. 4, when the controller accelerates the motor 113 when the unbalance value UB of the drum 124 is P0 close to the minimum value, the unbalance value UB of the drum 124 increases during the transient vibration range. For example, large vibrations are produced during the transient vibration range.

The unbalance value UB of the drum 124, which is appropriate for accelerating the motor 113, is experimentally obtained and stored depending on the amount of laundry received in the drum 124 and the rotational direction of the drum 124.

In summary, the controller calculates the unbalance value UB of the drum 124, traces a variation in the unbalance value UB, and accelerates the motor 113 when the unbalance value UB decreases to be equal to the stored value P0.

Figure 5:
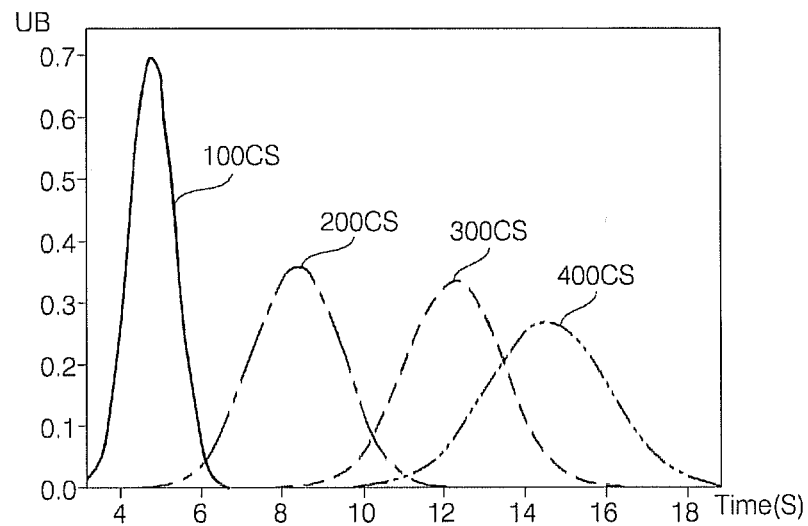
FIG. 5 illustrates periods of an unbalance value of a drum depending on the viscosity of a balancer included in a washing machine according to an embodiment of the present invention.

FIG. 5 illustrates periods of an unbalance value of a drum depending on the viscosity of a balancer included in a washing machine according to an embodiment of the present invention.

The viscosity of a fluid filled in the balancer 126 varies depending on the temperature of the fluid. FIG. 5 illustrates a variation in unbalance value UB of the drum depending on the kinematic viscosity of the balancer 126. Referring to FIG. 5, when the kinematic viscosity of the balancer is 100 CS (Centi Strokes), 200 CS, 300 CS, and 400 CS, the period of the unbalance value UB is about 4.8 sec, 8.4 sec, 12.2 sec, and 14.6 sec, respectively. For example, as the viscosity of the balancer 126 increases, the unbalance value UB of the drum 124 has an increasing period.

Figure 6:
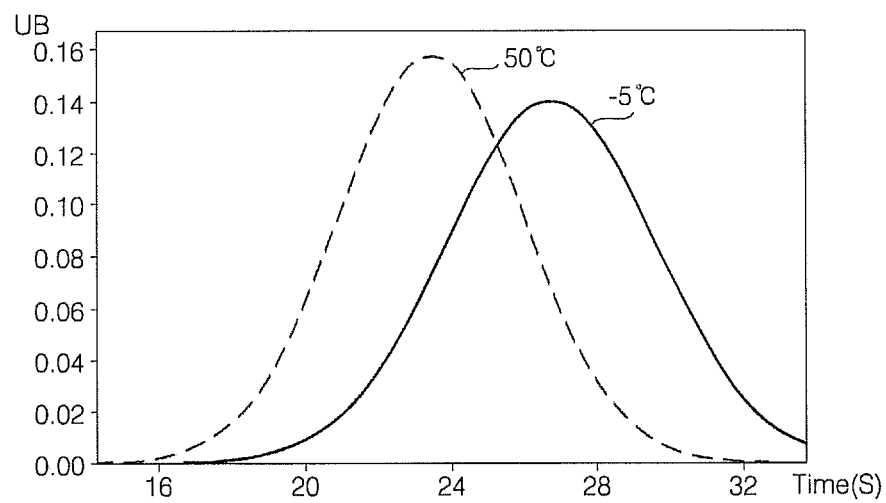
FIG. 6 illustrates periods of an unbalance value of a drum depending on the temperature of a balancer included in a washing machine according to an embodiment of the present invention.

FIG. 6 illustrates periods of an unbalance value of a drum depending on the temperature of a balancer included in a washing machine according to an embodiment of the present invention.

FIG. 6 illustrates a variation in unbalance value UB of the drum depending on the temperature of the balancer 126. When the temperature of the balancer 126 is 50° C. and −5° C., the period of the unbalance value UB is about 23.5 sec and about 26.7 sec, respectively. For example, as the temperature of the balancer 126 increases, the unbalance value UB of the drum 124 has a decreasing period.

It can be seen in FIGS. 4 and 5 that as the temperature of the balancer 126 increases, the viscosity of the balancer decreases and thus the period of the unbalance value UB of the drum 124 gradually decreases. From the experimental results, the temperature T of the balancer 126 may be calculated based on the period UB_time of the unbalance value UB of the drum 124 as follows:

$$T = K1 - K2 * UB\_time$$

Constants K1 and K2 may vary depending on the type of washing machine. For example, constants K1 and K2 may be experimentally obtained based on the type of the balancer 126, size or weight of the drum 124, or capacity of the motor 113.

Figure 7:
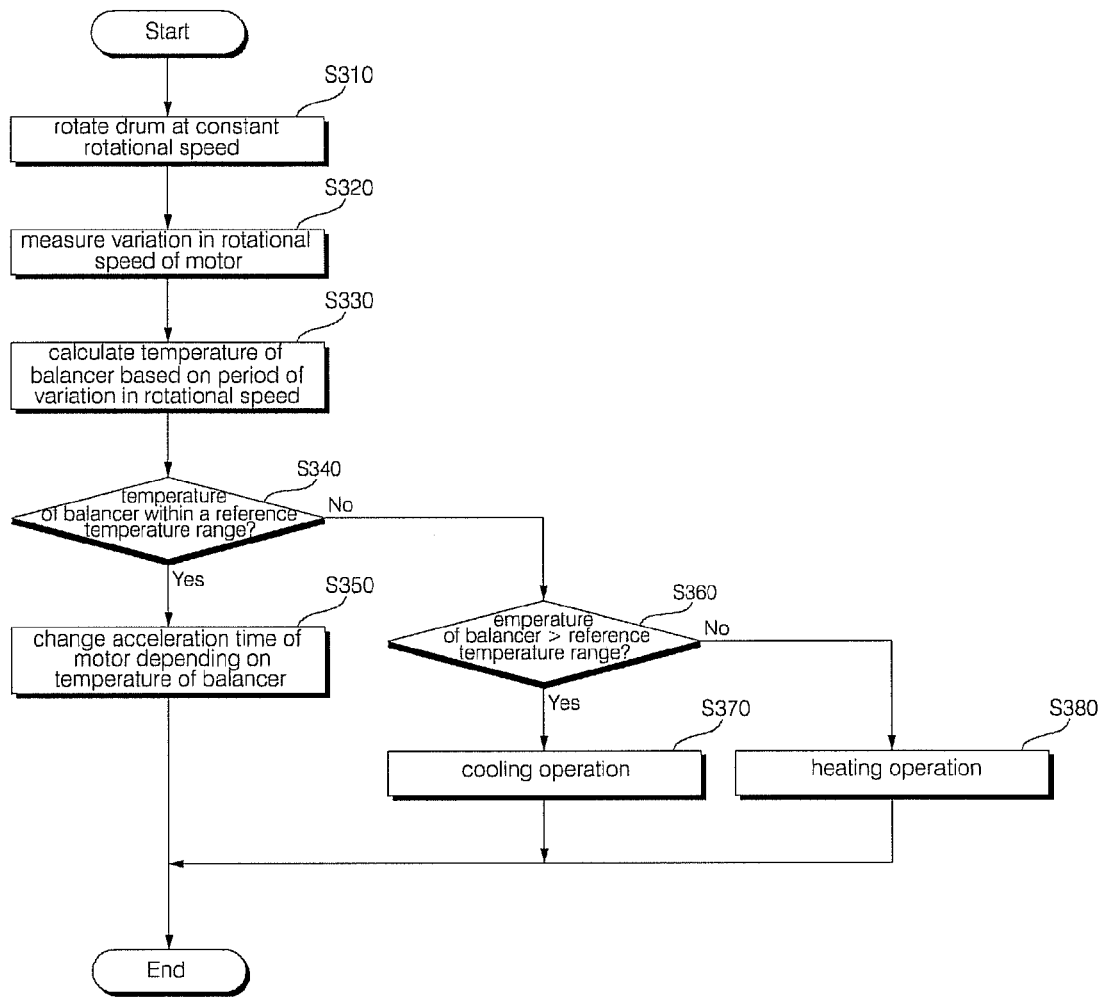
FIG. 7 is a flowchart illustrating a method of controlling a washing machine according to an embodiment of the present invention.

FIG. 7 is a flowchart illustrating a method of controlling a washing machine according to an embodiment of the present invention.

Before performing an operation of rotating the drum 124 at high speed, such as dehydration, the controller rotates the drum 124 at a constant rotational speed (S310). For example, the controller may rotate the motor 113 at 108 RPM which does not produce a lot of variations and noise.

The controller measures a variation in rotational speed of the motor 113 (S320). Even when the drum 124 is rotated at a constant rotational speed, the rotational speed of the rotor 113b slightly varies due to an unbalance of the drum 124. The controller produces an unbalance value UB of the drum 124 based on the variation in rotational speed of the rotor 113b.

The controller calculates a temperature of the balancer 126 based on the variation in rotational speed (S330). The unbalance value UB of the drum 124 is calculated based on the variation in rotational speed, and the temperature of the balancer 126 is calculated based on a period of the unbalance value UB. The temperature T of the balancer 126 may be obtained based on the period UB_time of the unbalance value UB as described above in the following experimental equation:

$$T = K1 - K2 * UB\_time$$

The controller determines whether the temperature T of the balancer 126 is within a reference temperature range (S340). When the temperature of the balancer 126 is too high, the period of the unbalance value UB is too short, thus making it difficult to determine a proper acceleration time. When the temperature of the balancer 126 is too low, the period of the unbalance value UB is too long and the proper acceleration time is likewise difficult to determine. Accordingly, it is determined whether the obtained temperature T of the balancer 126 is between the minimum value T1 and the maximum value T2 which is a reference temperature range.

If the obtained temperature T of the balancer 126 is within the reference temperature range (T1<T<T2), the acceleration time of the motor 113 is changed depending on the temperature T of the balancer (S350). Since the period of the unbalance value UB varies depending on the temperature T of the balancer, it is preferable to change the unbalance value UB appropriate for accelerating the motor 113?that is, "P0". This will be described below in detail with reference to FIG. 8.

It is determined whether the obtained temperature T of the balancer 126 is larger than the maximum temperature T2 of the reference temperature range (S360). If the temperature T is larger than the temperature T2 (T>T2), an operation of cooling the balancer 126 is performed (S370).

The cooling operation of the balancer 126 may be performed in various manners. For example, the balancer 126 may be cooled by introducing cool water into the tub 122. For example, the balancer 126 may be cooled by introducing washing water into the tub 122 after stopping the motor 113, reversely rotating the motor 113, and then discharging the washing water from the tub 122.

If the obtained temperature T of the balancer 126 is smaller than the minimum temperature T1 of the reference temperature range (T<T1), an operation of heating the balancer 126 is performed (S380).

The heating operation may be performed by various manners. For example, the balancer 126 may be heated by introducing hot water into the tub 122. The temperature is too low, water might not be introduced into the tub. Accordingly, an error may be displayed on the display unit 114a of the control panel 114 with the motor 113 stopped.

Figure 8:
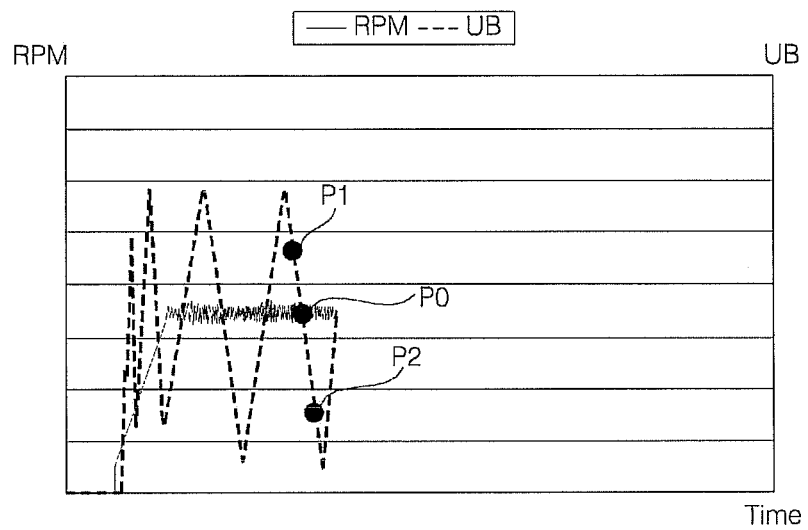
FIG. 8 illustrates a variation in unbalance value that accelerates the motor depending on the temperature in a washing method according to an embodiment of the present invention.

FIG. 8 illustrates a variation in unbalance value that accelerates the motor depending on the temperature in a washing method according to an embodiment of the present invention.

If the temperature T of the balancer 126 is high, the period of the unbalance value UB decreases. Accordingly, the acceleration time may be put earlier to locate the balancer 126 at a proper position during the transient vibration range. If the unbalance value UB of the drum 124 appropriate for accelerating the motor 113 when the temperature T of the balancer 126 is a reference temperature is P0, the unbalance value UB of the drum 124 for accelerating the motor 113 when the temperature T of the balancer 126 is higher than the reference temperature becomes P1 that is larger than P0.

In contrast, if the temperature T of the balancer 126 is low, the period of the unbalance value UB increases, and the acceleration time may be thus put later to locate the balancer 126 at a proper position during the transient vibration range. Accordingly, if the unbalance value UB of the drum 124 appropriate for accelerating the motor 113 when the temperature T of the balancer 126 is a reference temperature is P0, the unbalance value UB of the drum 124 for accelerating the motor 113 when the temperature T of the balancer 126 is lower than the reference temperature becomes P2 that is smaller than P0.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A washing machine comprising:
   a rotatable drum that receives laundry;
   a motor that rotates the drum;
   a balancer that is connected to the drum, the balancer changing a center of gravity of the drum;
   a controller that rotates the motor at a constant rotational speed and then calculates a temperature of the balancer based on a period of a variation in rotational speed of the motor due to an unbalance of the drum, and
   changing acceleration time of the motor based on the temperature of the balancer.

2. The washing machine of claim 1, wherein the controller compares the temperature of the balancer with a reference temperature to change the acceleration time of the motor.

3. The washing machine of claim 2, wherein the controller puts the acceleration time of the motor earlier when the temperature of the balancer is higher than the reference temperature.

4. The washing machine of claim 2, wherein the controller puts the acceleration time of the motor later when the temperature of the balancer is lower than the reference temperature.

5. The washing machine of claim 1, further comprising:
   a tub that is arranged to surround the drum, the tub receiving water, wherein the controller introduces cool water into the tub when the temperature of the balancer is higher than a maximum temperature of a reference temperature range.

6. The washing machine of claim 1, further comprising:
a tub that is arranged to surround the drum, the tub receiving water, wherein the controller stops the motor, introduces water into the tub, reversely rotates the motor, and then discharges the water from the tub when the temperature of the balancer is higher than a maximum temperature of a reference temperature range.

7. The washing machine of claim 1, further comprising:
a tub that is arranged to surround the drum, the tub receiving water, wherein the controller introduces hot water into the tub when the temperature of the balancer is lower than a minimum temperature of a reference temperature range.

8. The washing machine of claim 1, wherein the controller stops the motor when the temperature of the balancer is lower than a minimum temperature of a reference temperature range.

9. A method of controlling a washing machine, the method dehydrating laundry received in a drum combined with a balancer by accelerating the drum after having rotated the drum at a constant rotational speed, the method comprising:
rotating a motor at a constant rotational speed, the motor rotating the drum;
calculating a temperature of the balancer based on a period of a variation in rotational speed of the motor due to an unbalance of the drum; and
changing acceleration time of the motor based on the temperature of the balancer.

10. The method of claim 9, further comprising:
accelerating the motor by putting an acceleration time of the motor earlier when the temperature of the balancer is higher than a reference temperature.

11. The method of claim 9, further comprising:
accelerating the motor by putting an acceleration time of the motor later when the temperature of the balancer is lower than a reference temperature.

12. The method of claim 9, further comprising:
introducing cool water into a tub surrounding the drum when the temperature of the balancer is higher than a maximum temperature of a reference temperature range.

13. The method of claim 9, further comprising:
when the temperature of the balancer is higher than a maximum temperature of a reference temperature range,
stopping the motor;
introducing water into a tub surrounding the drum;
reversely rotating the motor and then stopping the motor; and
discharging the water from the tub.

14. The method of claim 9, further comprising:
introducing hot water into a tub surrounding the drum when the temperature of the balancer is lower than a minimum temperature of a reference temperature range.

15. The method of claim 9, further comprising:
stopping the motor when the temperature of the balancer is lower than a minimum temperature of a reference temperature range.

* * * * *